(12) United States Patent
Seo et al.

(10) Patent No.: US 9,385,792 B2
(45) Date of Patent: Jul. 5, 2016

(54) METHOD FOR TRANSMITTING CODEWORDS IN MULTIPLE INPUT MULTIPLE OUTPUT SYSTEM

(75) Inventors: Dong Youn Seo, Anyang-si (KR); Bong Hoe Kim, Anyang-si (KR); Young Woo Yun, Anyang-si (KR); Ki Jun Kim, Anyang-si (KR); Dae Won Lee, Anyang-si (KR); Yu Jin Noh, Anyang-si (KR); Hak Seong Kim, Anyang-si (KR); Dong Wook Roh, Anyang-si (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 501 days.

(21) Appl. No.: 12/669,759

(22) PCT Filed: Aug. 14, 2008

(86) PCT No.: PCT/KR2008/004742
§ 371 (c)(1),
(2), (4) Date: Jan. 19, 2010

(87) PCT Pub. No.: WO2009/022872
PCT Pub. Date: Feb. 19, 2009

(65) Prior Publication Data
US 2010/0195594 A1 Aug. 5, 2010

Related U.S. Application Data

(60) Provisional application No. 60/956,382, filed on Aug. 16, 2007, provisional application No. 60/976,486, filed on Oct. 1, 2007, provisional application No. 60/984,712, filed on Nov. 1, 2007.

(30) Foreign Application Priority Data

Jul. 17, 2008 (KR) .................. 10-2008-0069668

(51) Int. Cl.
*H04B 7/216* (2006.01)
*H04B 7/04* (2006.01)
(Continued)

(52) U.S. Cl.
CPC .............. *H04B 7/0417* (2013.01); *H04B 7/063* (2013.01); *H04B 7/0632* (2013.01);
(Continued)

(58) Field of Classification Search
CPC .. H04W 16/28; H04W 72/046; H04B 7/0413; H04B 7/0456; H04L 25/03949; H04L 25/03898
USPC .......................................... 370/310–350, 479
See application file for complete search history.

(56) References Cited

U.S. PATENT DOCUMENTS 6,031,831 A 2/2000 Tan Boon et al.
6,359,923 B1 3/2002 Agee et al.
(Continued)

FOREIGN PATENT DOCUMENTS

CN 1797986 A 7/2006
CN 101013917 A 8/2007
(Continued)

OTHER PUBLICATIONS

Catt et al: "Indication of PHICH resource for TDD" 3GPP Draft; R1-081326; vol. RAN WG1, no. Shenzhen, China; Mar. 26, 2008, XP050109752.

(Continued)

*Primary Examiner* — Andrew Chriss
*Assistant Examiner* — Kenan Cehic
(74) *Attorney, Agent, or Firm* — Birch, Stewart, Kolasch & Birch, LLP

(57) ABSTRACT

A method for effectively transmitting/receiving a codeword in a MIMO system is disclosed. In a system including a plurality of predetermined rank structures, a reception end transmits rank information (RI), precoding matrix index (PMI), and channel quality information (CQI) of each codeword to a transmission end. The transmission end selects a rank structure on the basis of information received from the reception end. The transmission end selects only some codeword blocks among a plurality of codeword blocks available for the selected rank structure, transmits signals via the selected codeword blocks, and transmits a null signal for the non-selected codeword blocks.

4 Claims, 6 Drawing Sheets

(51) Int. Cl.

| | | |
|---|---|---|
| *H04B 7/06* | (2006.01) | |
| *H04L 1/06* | (2006.01) | |
| *H04L 1/18* | (2006.01) | |
| *H04L 1/00* | (2006.01) | |
| *H04L 25/03* | (2006.01) | |

(52) U.S. Cl.
CPC ........... *H04B 7/0639* (2013.01); *H04L 1/0026* (2013.01); *H04L 1/06* (2013.01); *H04L 1/1893* (2013.01); *H04L 1/0003* (2013.01); *H04L 1/0009* (2013.01); *H04L 25/03343* (2013.01)

(56) References Cited

U.S. PATENT DOCUMENTS

| | | |
|---|---|---|
| 6,480,522 B1 | 11/2002 | Hoole et al. |
| 6,621,851 B1 | 9/2003 | Agee et al. |
| 6,628,956 B2 | 9/2003 | Bark et al. |
| 6,804,307 B1 | 10/2004 | Popovic |
| 6,873,606 B2 | 3/2005 | Agrawal et al. |
| 7,106,781 B2 | 9/2006 | Agee et al. |
| 7,149,238 B2 | 12/2006 | Agee et al. |
| 7,430,244 B2 | 9/2008 | Chung et al. |
| 7,433,347 B1 | 10/2008 | Trott et al. |
| 7,469,015 B2 | 12/2008 | Le Nir et al. |
| 7,577,085 B1 | 8/2009 | Narasimhan |
| 7,623,441 B1 | 11/2009 | Sampath et al. |
| 7,675,886 B2 | 3/2010 | Agrawal et al. |
| 7,720,168 B2 | 5/2010 | Su et al. |
| 7,724,639 B1 | 5/2010 | Porat et al. |
| 7,724,838 B2 | 5/2010 | Mantravadi |
| 7,773,685 B2 | 8/2010 | Tirkkonen et al. |
| 7,778,151 B2 | 8/2010 | Bertrand et al. |
| 7,852,806 B2 | 12/2010 | Ahn et al. |
| 7,869,402 B2 | 1/2011 | Yoon et al. |
| 7,881,222 B2 | 2/2011 | Lee et al. |
| 7,889,633 B2 | 2/2011 | Noh et al. |
| 7,894,330 B2 | 2/2011 | Lee et al. |
| 7,920,638 B2 | 4/2011 | Le Nir et al. |
| 7,929,563 B2 | 4/2011 | Wang et al. |
| 7,961,807 B2 * | 6/2011 | Kotecha et al. ............... 375/267 |
| 7,991,063 B2 | 8/2011 | Khan et al. |
| 8,014,769 B2 | 9/2011 | Lee et al. |
| 8,019,332 B2 | 9/2011 | Lee et al. |
| 8,027,297 B2 | 9/2011 | Kim et al. |
| 8,031,583 B2 | 10/2011 | Classon et al. |
| 8,031,668 B2 | 10/2011 | Wang et al. |
| 8,036,197 B2 | 10/2011 | Pajukoski et al. |
| 8,041,362 B2 | 10/2011 | Li et al. |
| 8,050,227 B2 | 11/2011 | Lee et al. |
| 8,116,271 B2 | 2/2012 | Pi |
| 8,155,069 B2 | 4/2012 | Chun et al. |
| 8,155,227 B2 | 4/2012 | Duan et al. |
| 8,194,579 B2 | 6/2012 | Lee et al. |
| 8,351,392 B2 | 1/2013 | Ahn et al. |
| 8,498,254 B2 | 7/2013 | Dai et al. |
| 8,625,509 B2 | 1/2014 | Ahn et al. |
| 8,631,298 B2 | 1/2014 | Lee et al. |
| 8,964,878 B2 | 2/2015 | Seo et al. |
| 2001/0024427 A1 | 9/2001 | Suzuki |
| 2003/0067907 A1 | 4/2003 | Rezaiifar et al. |
| 2003/0083069 A1 | 5/2003 | Vadgama |
| 2003/0185159 A1 | 10/2003 | Seo et al. |
| 2004/0058687 A1 | 3/2004 | Kim et al. |
| 2004/0081112 A1 | 4/2004 | Chen et al. |
| 2004/0133841 A1 | 7/2004 | Lundby et al. |
| 2004/0257978 A1 | 12/2004 | Shao et al. |
| 2005/0025039 A1 | 2/2005 | Hwang et al. |
| 2005/0052991 A1 | 3/2005 | Kadous |
| 2005/0063378 A1 | 3/2005 | Kadous |
| 2005/0068918 A1 | 3/2005 | Mantravadi et al. |
| 2005/0068931 A1 | 3/2005 | Cho et al. |
| 2005/0143114 A1 | 6/2005 | Moulsley et al. |
| 2005/0157680 A1 | 7/2005 | Zhang et al. |
| 2005/0180328 A1 | 8/2005 | Kim et al. |
| 2005/0186981 A1 | 8/2005 | Nishio |
| 2005/0250540 A1 | 11/2005 | Ishii et al. |
| 2005/0265250 A1 | 12/2005 | Gollamudi et al. |
| 2006/0018259 A1 * | 1/2006 | Kadous ........................ 370/236 |
| 2006/0023745 A1 | 2/2006 | Koo et al. |
| 2006/0034240 A1 | 2/2006 | Kwak et al. |
| 2006/0034383 A1 | 2/2006 | Su et al. |
| 2006/0035643 A1 | 2/2006 | Vook et al. |
| 2006/0045010 A1 | 3/2006 | Baker et al. |
| 2006/0067413 A1 | 3/2006 | Tsai |
| 2006/0128410 A1 | 6/2006 | Derryberry et al. |
| 2006/0146867 A1 | 7/2006 | Lee et al. |
| 2006/0171342 A1 | 8/2006 | Dateki |
| 2006/0193373 A1 | 8/2006 | Agee et al. |
| 2006/0209970 A1 | 9/2006 | Kanterakis |
| 2006/0285505 A1 | 12/2006 | Cho et al. |
| 2007/0010957 A1 | 1/2007 | Sampath et al. |
| 2007/0011550 A1 | 1/2007 | Agrawal et al. |
| 2007/0040703 A1 | 2/2007 | Akkarakaran et al. |
| 2007/0070944 A1 | 3/2007 | Rinne et al. |
| 2007/0140178 A1 | 6/2007 | Jung et al. |
| 2007/0165739 A1 | 7/2007 | Hottinen et al. |
| 2007/0171849 A1 | 7/2007 | Zhang et al. |
| 2007/0183380 A1 | 8/2007 | Rensburg et al. |
| 2007/0183384 A1 | 8/2007 | Kwak et al. |
| 2007/0211656 A1 | 9/2007 | Kwak et al. |
| 2007/0217540 A1 | 9/2007 | Onggosanusi et al. |
| 2007/0223618 A1 | 9/2007 | Jeong et al. |
| 2007/0253465 A1 | 11/2007 | Muharemovic et al. |
| 2007/0286261 A1 | 12/2007 | Molev-Shteiman |
| 2007/0298728 A1 | 12/2007 | Imamura et al. |
| 2008/0013610 A1 * | 1/2008 | Varadarajan et al. ......... 375/221 |
| 2008/0019307 A1 | 1/2008 | Tenny et al. |
| 2008/0032630 A1 | 2/2008 | Kim et al. |
| 2008/0037464 A1 * | 2/2008 | Lim et al. ..................... 370/329 |
| 2008/0043867 A1 * | 2/2008 | Blanz et al. .................. 375/260 |
| 2008/0043874 A1 | 2/2008 | Lee et al. |
| 2008/0080634 A1 | 4/2008 | Kotecha et al. |
| 2008/0101211 A1 | 5/2008 | Rao |
| 2008/0101407 A1 | 5/2008 | Khan et al. |
| 2008/0151831 A1 | 6/2008 | Khan et al. |
| 2008/0159323 A1 | 7/2008 | Rinne et al. |
| 2008/0182582 A1 | 7/2008 | Bachl et al. |
| 2008/0192674 A1 | 8/2008 | Wang et al. |
| 2008/0219219 A1 * | 9/2008 | Sartori et al. ................. 370/335 |
| 2008/0232234 A1 | 9/2008 | McCoy et al. |
| 2008/0232300 A1 | 9/2008 | McCoy et al. |
| 2008/0232395 A1 | 9/2008 | Buckley et al. |
| 2008/0233964 A1 | 9/2008 | McCoy et al. |
| 2008/0267310 A1 | 10/2008 | Khan et al. |
| 2008/0287155 A1 | 11/2008 | Xu et al. |
| 2008/0304467 A1 | 12/2008 | Papasakellariou et al. |
| 2008/0304593 A1 | 12/2008 | Khan et al. |
| 2008/0310540 A1 | 12/2008 | Tiirola et al. |
| 2009/0011700 A1 | 1/2009 | Nishio et al. |
| 2009/0011767 A1 | 1/2009 | Malladi et al. |
| 2009/0046672 A1 | 2/2009 | Malladi et al. |
| 2009/0046774 A1 | 2/2009 | Abou Rjeily |
| 2009/0046789 A1 | 2/2009 | Xu et al. |
| 2009/0055703 A1 | 2/2009 | Kim et al. |
| 2009/0073922 A1 | 3/2009 | Malladi et al. |
| 2009/0097447 A1 | 4/2009 | Han et al. |
| 2009/0109906 A1 | 4/2009 | Love et al. |
| 2009/0129335 A1 | 5/2009 | Lee et al. |
| 2009/0129749 A1 | 5/2009 | Oyamatsu et al. |
| 2009/0168922 A1 | 7/2009 | Malladi et al. |
| 2009/0175233 A1 | 7/2009 | Ojala et al. |
| 2009/0196240 A1 | 8/2009 | Frederiksen et al. |
| 2009/0201863 A1 | 8/2009 | Pi |
| 2009/0201904 A1 | 8/2009 | Lee et al. |
| 2009/0238131 A1 | 9/2009 | Montojo et al. |
| 2009/0245187 A1 | 10/2009 | Nam et al. |
| 2009/0259909 A1 | 10/2009 | Luo |
| 2009/0268621 A1 | 10/2009 | Hoshino et al. |
| 2009/0274037 A1 | 11/2009 | Lee et al. |
| 2009/0290597 A1 | 11/2009 | Baumgartner et al. |
| 2009/0303866 A1 | 12/2009 | Li et al. |
| 2009/0316811 A1 | 12/2009 | Maeda et al. |
| 2010/0067445 A1 | 3/2010 | Rinne et al. |

(56) References Cited

U.S. PATENT DOCUMENTS

| | | | |
|---|---|---|---|
| 2010/0103814 A1 | 4/2010 | Chun et al. | |
| 2010/0118796 A1 | 5/2010 | Yi et al. | |
| 2010/0118800 A1 | 5/2010 | Kim et al. | |
| 2010/0220708 A1 | 9/2010 | Mantravadi et al. | |
| 2010/0260115 A1 | 10/2010 | Frederiksen et al. | |
| 2011/0142097 A1 | 6/2011 | Walton et al. | |
| 2011/0176502 A1 | 7/2011 | Chung et al. | |
| 2011/0195719 A1 | 8/2011 | Chmiel et al. | |
| 2011/0292900 A1 | 12/2011 | Ahn et al. | |
| 2012/0033650 A1 | 2/2012 | Ahn et al. | |
| 2012/0087363 A1* | 4/2012 | Jongren et al. | 370/342 |
| 2012/0287901 A1 | 11/2012 | Ahn et al. | |
| 2013/0039292 A1 | 2/2013 | Liu et al. | |
| 2013/0070702 A1 | 3/2013 | Ko et al. | |
| 2013/0083750 A1 | 4/2013 | Nazar et al. | |
| 2013/0235812 A1 | 9/2013 | Heo et al. | |
| 2013/0322340 A1 | 12/2013 | Nishio et al. | |

FOREIGN PATENT DOCUMENTS

| | | |
|---|---|---|
| EP | 1175022 A2 | 1/2002 |
| EP | 1349292 A2 | 10/2003 |
| EP | 1389848 A1 | 2/2004 |
| EP | 1720310 A2 | 11/2006 |
| EP | 1 746 855 A2 | 1/2007 |
| EP | 1784036 A1 | 5/2007 |
| EP | 1819088 A2 | 8/2007 |
| EP | 2103017 B1 | 1/2014 |
| JP | 2001-238269 A | 8/2001 |
| JP | 2005-522911 A | 7/2005 |
| JP | 2007-28569 A | 2/2007 |
| JP | 2008-54313 A | 3/2008 |
| KR | 10-2002-0009079 A | 2/2002 |
| KR | 10-2005-0014695 A | 2/2005 |
| KR | 10-2005-0057926 A | 6/2005 |
| KR | 10-2006-0092055 A | 8/2006 |
| KR | 10-0729861 B1 | 6/2007 |
| KR | 10-2007-0073608 A | 7/2007 |
| WO | WO-01/76110 A2 | 10/2001 |
| WO | WO-2004/049613 A2 | 6/2004 |
| WO | WO-2004/051872 A2 | 6/2004 |
| WO | WO 2005/015801 A2 | 2/2005 |
| WO | WO-2005/074312 A1 | 8/2005 |
| WO | WO 2005/099103 A1 | 10/2005 |
| WO | WO-2005/114888 A1 | 12/2005 |
| WO | WO-2005/117319 A1 | 12/2005 |
| WO | WO 2006/020339 A2 | 2/2006 |
| WO | WO 2006/028204 A1 | 3/2006 |
| WO | WO 2006/107835 A1 | 10/2006 |
| WO | WO 2006/129749 A1 | 12/2006 |
| WO | WO 2006/130742 A1 | 12/2006 |
| WO | WO-2006/138337 A | 12/2006 |
| WO | WO 2007/015305 A1 | 2/2007 |
| WO | WO-2007066936 A2 | 6/2007 |
| WO | WO 2007/092258 A1 | 8/2007 |

OTHER PUBLICATIONS

Ericsson: "E-mail summary taking you forward on downlink control signaling" 3GPP Draft; R1-074369, vol. RAN WG1, No. Shanghai, China; Oct. 5, 2007, XP050107884.

LG Electronics: "Allocation of UL ANK/NACK index" 3GPP Draft; R1-072348-UL ACK/NACK, vol. RAN WG1, No. Kobe, Japan; May 2, 2007, XP050106077.

LG Electronics: "PHICH duration and signaling" 3GPP Draft; R1-073476-PHICH Configuration, vol. RAN WG1, No. Athens, Greece; Aug. 15, 2007, XP050107084.

Motorola: "PHICH Resource for TDD & FDD"; 3GPP Draft; R1-080433-PHICH Resource; vol. RAN WG1, No. Sevilla, Spain Jan. 9, 2008, XPO5018952.

Motorola: "PHICH Resource Signaling for TDD & FDD" 3GPP Draft R1-081286-PHICH Resource Signaling for TDD AND FDD; vol. RAN WG1, No. Shenzhen, China; Mar. 27, 2008, XP050109724.

3GPP, "Technical Specification Group Radio Access Network; Evolved Universal Terrestrial Radio Access (E-UTRA) Radio Resource (RPC); Protocol specification (Release 8)," 3GPP TS 36.331, V8.0.0, Dec. 2007, (relevant portion of p. 85 only provided).

3GPP, "Technical Specification Group Radio Access Network; Evolved Universal Terrestrial Radio Access (E-UTRA); Radio Resource Control (RCC); Protocol specification (Release 8)," 3GPP TS 36.331, V8.14.0, Jun. 2011 (relevant portion of p. 42 only provided).

Samsung, "UL Reference signal multiplexing," 3GPP TSG RAN WG1 Meeting #47, Riga, Latvia, Nov. 2006, R1-063257, 4 pages.

Nokia, "Data-non-associated control signal transmission with UL data," 3GPP TSG RAN WG1, Meeting #48, St. Louis, USA, Feb. 12-16, 2007, Retrieved from the internet: URL:http:/www.3gpp.org/FTP/tsg_ran/WG1_RL1/TSGR1_48/Docs/.

3rd Generation Partnership Project: "Technical Specification Group Radio Access Network; LTE Physical Layer—General Description (Release 8)," 3GPP TS 36.201, V0.3.1, St. Louis, USA, Mar. 2007, pp. 1-12.

LTD Rapporteur (NTT DoCoMo): "Text proposal for TS 36.300 (Stage 2 TS)," 3GPP TSG RAN WG1, Meeting #48, St. Louis, USA, Feb. 12-16, 2007.

Heesoo Lee et al., "Novel Multi-User MIMO Scheme Based on Successive Interference Cancellation", Consumer Electronics. 2007, ISCE 2007, IEEE Intl. Symposium, Jun. 1, 2007, pp. 1-5, XP031160370.

"LS on Physical Channel Definition," 3GPP TSG RAN WG1 Meeting #49bis, R1-073231, Orlando, Florida USA, Jun. 25-29, 2007, 2 pages.

English-language Abstract Only for RU 2300175, dated May 27, 2007.

"CQI Feedback Control and Content in E-UTRA" Panasonic, 3GPP Draft; R1-072077, 3rd. Generation Partnership Project (3GPP), XP050105831, pp. 1-5, May 2, 2007.

Mitsubishi Electric, "UE and CCE specific scrambling codes for low complexity blind detection of downlink control signaling," 3GPP TSG RAN WG1 #49 meeting, Kobe, Japan, R1-072063, May 7-11, 2007 (9 pages).

Motorola, "Search Space Definition for L1/L2 Control Channels," 3GPP TSG RAN1#49bis, Orlando, USA, R1-072691, Jun. 25-29, 2007 (11 pages).

Goransson et al., "Evolution of WCDMA High Speed Packet Access and Broadcast Services," IEEE, 2007, 5 pages, XP031189506A.

IEEE, "Part 16: Air Interface for Broadband Wireless Access Systems," IEEE, P802.16Rev2/D0b, Jun. 27, 2007, 1754 pages, XP017631176A.

LG Electronics, "CQI Overheard Reduction for MIMO in Frequency Domain", 3GPP TSG RAN WG1 #48bis, R1-071545, St. Julians, Malta, pp. 1-5, Mar. 25-30, 2007.

Texas Instruments, Views on MIMO-Related UE Feedback, 3GPP TSG RAN WG1 47bis, R1-090273, Sorrento, Italy, pp. 1-3, Jan. 15-19, 2007.

Kim, "On Capacity of Quality-Based Channel-State Reporting in Mobile Systems With Greedy Transmission Scheduling", IEEE Transactions on Communications, vol. 54, No. 6, Jun. 2006, pp. 975-979.

3GPP TSG RAN WG1 47, R1-063238, "Aspects of Codebook-based Pre-coding for E-UTRA MIMO," Texas Instruments, Nov. 10, 2006, 3 pages.

3GPP TSG-RAN WG1 #50, R1-073735, "Extending Codeword to Layer Mapping for Efficient Support of Retransmissions," Ericsson, Aug. 20-24, 2007, 2 pages.

3GPP, "Technical Specification Group Radio Access Network; Physical Layer Aspects for Evolved UTRA (Release 7)", 3GPP TR 25.814, V1.0.1, Nov. 2005, 72 pages.

Interdigital Communications Corporation, "Uplink MIMO SC-FDMA Scheme for EUTRA", 3GPP TSG RAN WG1 #43, R1-051368, Nov. 7-11, 2005, 6 pages.

Ntt Docomo et al., "Multiplexing Method of Shared Control Channel in Uplink Single-Carrier FDMA Radio Access", TSG-RAN WG1 #42bis, R1-051143 (Original R1-050591), Oct. 10-14, 2005, 9 pages.

Samsung, "Data and Control Channel Multiplexing in SC-FDMA for EUTRA Uplink", 3GPP TSG RAN WG1 Meeting #43, R1-051343, Nov. 7-11, 2005, 2 pages.

* cited by examiner (a)

(b)

(c)

METHOD FOR TRANSMITTING CODEWORDS IN MULTIPLE INPUT MULTIPLE OUTPUT SYSTEM

This application is the National Phase of PCT/KR2008/004742 filed on Aug. 14, 2008, which claims priority under 35 U.S.C. 119(e) to U.S. Provisional Application No. 60/956,382, 60/976,486 and 60/984,712 filed on Aug. 16, 2007, Oct. 1, 2007 and Nov. 1, 2007, and under 35 U.S.C. 119(a) to Patent Application No. 10-2008-0069668 filed in Korea on Jul. 17, 2008, all of which are hereby expressly incorporated by reference into the present application.

TECHNICAL FIELD

The present invention relates to a method for transmitting/receiving signals in a Multiple Input Multiple Output (MIMO) system for use in a broadband wireless mobile communication system.

BACKGROUND ART

A conventional MIMO technology will hereinafter be described in detail. In brief, the MIMO technology is an abbreviation of the Multi-Input Multi-Output technology. The MIMO technology uses multiple transmission (Tx) antennas and multiple reception (Rx) antennas to improve the efficiency of Tx/Rx data, whereas a conventional art has generally used a single transmission (Tx) antenna and a single reception (Rx) antenna. In other words, the MIMO technology allows a transmission end or reception end of a wireless communication system to use multiple antennas (hereinafter referred to as a multi-antenna), so that the capacity or performance can be improved. For the convenience of description, the term "MIMO" can also be considered to be a multi-antenna technology.

The MIMO technology, which uses multiple antennas at all transmission/reception ends, from among a variety of technologies capable of improving the transfer efficiency of data can greatly increase an amount of communication capacity and Tx/Rx performances without allocating additional frequencies or increasing an additional power.

The above-mentioned MIMO technology can be classified into spatial diversity scheme and spatial multiplexing scheme. The spatial diversity scheme increases transmission reliability using symbols passing various channel paths. The spatial multiplexing scheme simultaneously transmits a plurality of data symbols via a plurality of Tx antennas, so that it increases a transfer rate of data. In addition, the combination of the spatial diversity scheme and the spatial multiplexing scheme has also been recently developed to properly acquire unique advantages of the two schemes.

The fading channel is a major cause of deterioration of a performance of a wireless communication system. A channel gain value is changed according to time, frequency, and space. The lower the channel gain value, the lower the performance. A representative method for solving the above-mentioned fading problem is using diversity. Diversity uses the fact that there is a low probability that all independent channels have low gain values.

A general communication system performs coding of transmission information of a transmission end using a forward error correction code, and transmits the coded information, so that an error experienced at a channel can be corrected by a reception end. The reception end demodulates a received (Rx) signal, and performs decoding of forward error correction code on the demodulated signal, so that it recovers the transmission information. By the decoding process, the Rx-signal error caused by the channel is corrected.

Generally, a Cyclic Redundancy Check (CRC) code has been used as an error detection code. The CRC method is an exemplary coding method for performing the error detection. Generally, the transmission information is coded by the CRC method, and then the forward error correction code is applied to the CRC-coded information.

In order to effectively operate the MIMO system, this MIMO system requires channel quality information (CQI) and rank information. This rank information indicates how many independent data streams can be transmitted at a current transmission (Tx) time. The MIMO system based on the precoding requires the precoding vector or the precoding matrix which is the most appropriate for a current channel status.

FIG. 2 is a conceptual diagram illustrating an uplink reporting system of Channel Quality Information (CQI).

The system of FIG. 2 can report the channel quality information (CQI). In order to reduce a load of uplink feedback, the system of FIG. 2 may change a time interval and a frequency band for measuring rank information (RI) and a precoding matrix index (PMI).

FIG. 3 is a block diagram illustrating an exemplary transmission structure of a MIMO system including the 4×4 antenna structure. Referring to FIG. 3, the number of streams capable of being transmitted can be decided according to rank number. For rank 1, a codeword of CW1 (a first codeword block 1) can be transmitted via one of four layers 1~4. A user equipment (UE) measures a channel status for each layer, selects the best channel having the best channel status from among several layers, and transmits signals via the selected channel. However, if the above-mentioned selection process and all the available combinations are allowed, the number of UE calculations increases, and the amount of signaling information applied to a Node-B also increases. Therefore, a trade-off is needed between a performance improvement and an overhead, such that a single combination is allowed for each rank as shown in FIG. 3.

Under the condition that only the combination of FIG. 3 is allowed, FIG. 4 is a conceptual diagram illustrating a method for retransmitting data when a data buffer is empty after the failure of transmission of a specific codeword. Referring to FIG. 4, provided that the codeword of CW1 and a codeword of CW2 (i.e., second codeword block 2) are transmitted, and provided that the same SINR (Signal to Interference plus Noise Ratio) is allocated to three layers, the codeword of CW2 can transmit a large number of data which is double that of the other codeword of CW1 transmitted via a single layer because the codeword of CW2 is transmitted via two layers. Thereafter, although reception of the codeword of CW1 has been successfully carried out, but a failure of reception of the codeword of CW2 occurs, only the codeword of CW2 may be retransmitted. If the data buffer of the transmission end is empty when the codeword of CW2 is retransmitted, there is no new data to be transmitted. Therefore, only the retransmission is required. In other words, only one codeword needs to be transmitted. However, the combination for each rank is restricted as shown in FIG. 3, such that a single codeword must be transmitted via a single layer of rank 1. In more detail, the codeword which has been transmitted via the CW2 of rank 3 is transmitted via the CW1 of rank 1. In this case, provided that there has been no channel variation, the codeword of CW2 of rank 3 is transmitted via a single layer mapped to CW1 of rank 1 during the retransmission, whereas the codeword of CW2 of rank 3 has been transmitted via two layers during the previous transmission, such that the loss of the amount of data capable of being transmitted occurs. That is, although a channel status is good, there occurs an unexpected situation in which a good channel is unavailable because the combination between an available codeword and a layer is restricted. As a result, there is needed an improved method for reducing the above-mentioned loss of Tx data under a given combination, and at the same time effectively transmitting Tx data.

DISCLOSURE

Technical Problem

Accordingly, the present invention is directed to a method for transmitting a codeword in a Multiple Input Multiple Output (MIMO) system that substantially obviates one or more problems due to limitations and disadvantages of the related art.

An object of the present invention is to provide a method capable of selecting good conditioned channel although the combination between an available codeword and a layer is restricted in a broadband wireless mobile communication system equipped with multiple antennas.

Technical Solution

To achieve these objects and other advantages and in accordance with the purpose of the invention, as embodied and broadly described herein, a signal transmission method of a transmission end of a Multiple Input Multiple Output (MIMO) system comprising: a) selecting a single rank structure designed for "n" number of codeword blocks to be used, from among several predetermined rank structures; b) selecting "m" number of codeword blocks from among the n number of codeword blocks of the selected rank structure (where $1 \leq m < n$, m, n: natural number); and c) transmitting signals according to each codeword mapped to each layer via one or more layers mapped to the "m" number of codeword blocks, and transmitting a null signal via at least one of other layers unmapped to the "m" number of codeword blocks.

Preferably, the null signal indicates that no signal is actually transmitted.

Preferably, the step a) of selecting rank structure includes: selecting the single rank structure on the basis of rank information (RI) reported from a reception end.

Preferably, the step b) of selecting the "m" number of codeword blocks includes: selecting "m" number of upper codeword blocks having the best channel quality indicator (CQI) values associated with at least one codeword reported from a reception end.

Preferably, the signal transmission method further comprises: transmitting, by the transmission end, control information including either Transport Block (TB) size information or Modulation Coding Scheme (MCS) information to a reception end.

Preferably, the signal transmission method further comprises: constructing the control information corresponding to (n−m) number of non-selected codeword blocks from among the "n" number of codeword blocks, such that the Transport Block (TB) size of the control information is denoted by a minimum value.

Preferably, if the transmission end always uses the latest rank reported from the reception end, Rank Information (RI) used by the transmission end is not included in the control information.

Preferably, if the transmission end always uses a Precoding Matrix Index (PMI) associated with a rank reported from the reception end, PMI-associated information used by the transmission end is not included in the control information.

Preferably, the signal transmission method further comprises: transmitting a signaling message indicating transmission of the null signal to a reception end.

Preferably, the step of transmitting the signaling message includes: transmitting at least one of a specific modulation coding scheme (MCS) index and a specific HARQ process ID via the transmission layer of the null signal, such that the signaling message is carried out, wherein the specific MCS index and the specific HARQ process ID are predetermined to indicate transmission of the null signal.

Preferably, if transport block (TB) size information is independently constructed in each codeword, the step of transmitting the signaling message is carried out by transmitting specific transport block (TB) size information via the transmission layer of the null signal, wherein the specific transport block (TB) size information is predetermined such that it indicates transmission of the null signal.

Preferably, a power unused by the at least one of other layers is distributed to the at least one layer.

Preferably, a modulation coding scheme (MCS) index increases in proportion to an increasing power of the at least one layer according to the distributed power.

Preferably, the signal transmission method further comprises: entering a retransmission (ReTx) codeword in the "m" number of codeword blocks; and entering no codeword in (n−m) number of codeword blocks other than the "m" number of selected codeword blocks from among the "n" number of codeword blocks.

Preferably, the value of "m" is 1 (i.e., m=1), and the value of "n" is 2 (i.e., n=2).

In another aspect of the present invention, there is provided a signal reception method of a reception end of a Multiple Input Multiple Output (MIMO) system comprising: selecting a single rank structure from among several predetermined rank structures; receiving a signaling message indicating that a null signal is transmitted to some codeword blocks selected from among several codeword blocks used in the selected rank structure; and decoding only the remaining codeword blocks other than the selected codeword blocks from among the several codeword blocks.

It is to be understood that both the foregoing general description and the following detailed description of the present invention are exemplary and explanatory and are intended to provide further explanation of the invention as claimed.

Advantageous Effects

In a case that a predetermined mapping relationship between codewords and layers is given for each rank, according to the present invention, an effective channel can be selected and data can be transmitted via the selected channel.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

In more detail, the MIMO technology is not dependent on a single antenna path to receive a single total message, collects a plurality of data segments received via several antennas, and recovers a total message. As a result, the MIMO technology can increase a data transfer rate within a specific coverage (i.e., a specific range), or can increase a system range at a specific data transfer rate.

The next-generation mobile communication technology requires a data transfer rate higher than that of a conventional mobile communication technology, so that it is expected that the effective MIMO technology is requisite for the next-generation mobile communication technology. Under this situation, the MIMO communication technology is the next-generation mobile communication technology capable of being applied to mobile communication terminals or repeaters, and can extend the range of a data communication range, so that it can overcome the limited amount of transfer data of other mobile communication systems due to a variety of limited situations.

Figure 1:
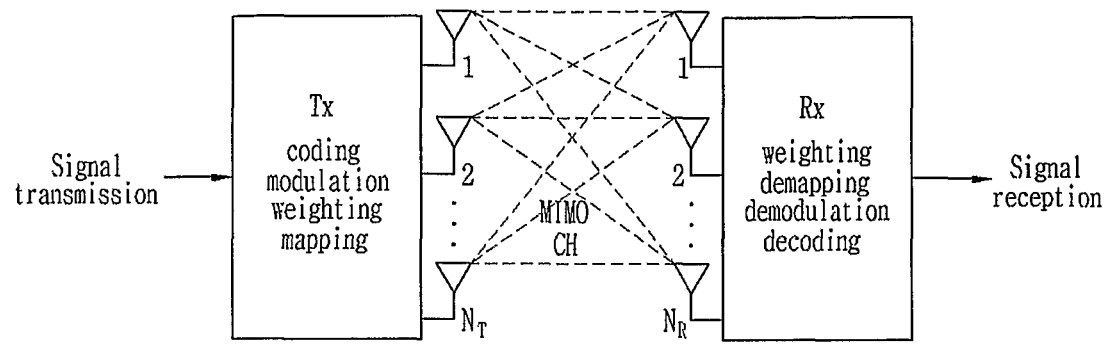
FIG. 1 is a conceptual diagram illustrating a general Multiple Input Multiple Output (MIMO) system.
Figure 2:
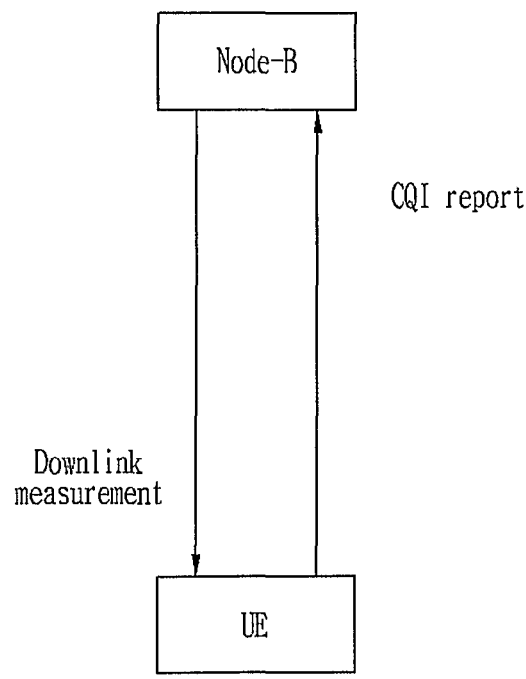
FIG. 2 is a conceptual diagram illustrating an uplink reporting of Channel Quality Information (CQI)
Figure 3:
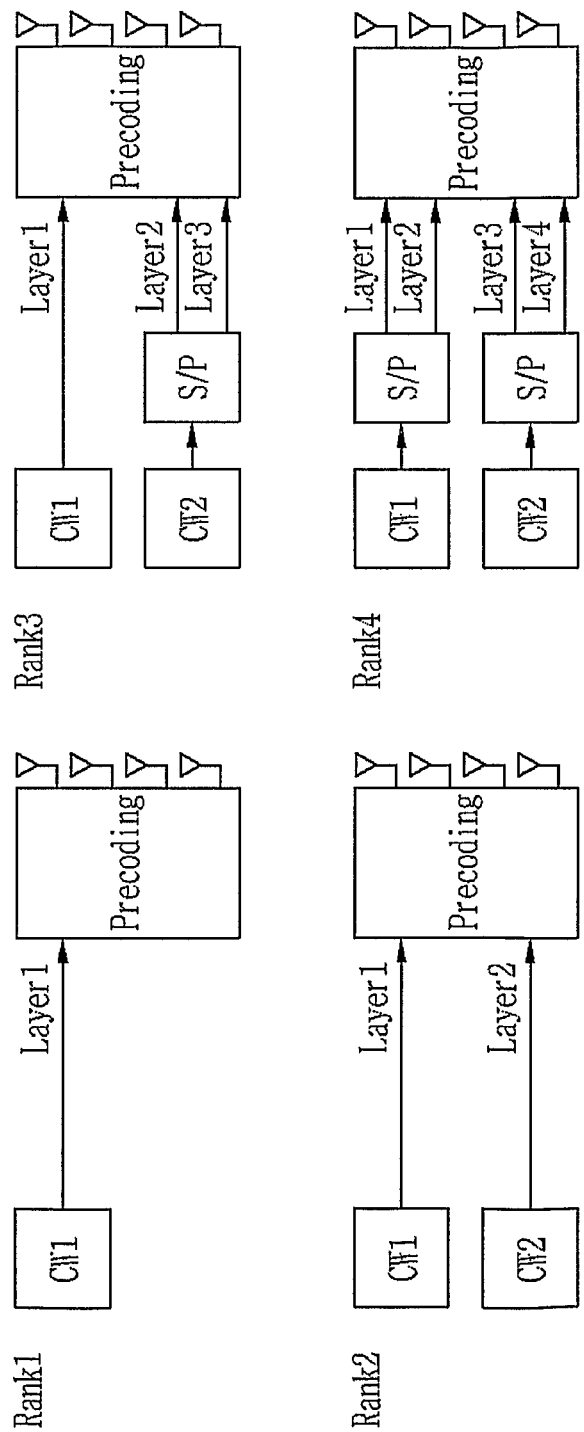
FIG. 3 is a block diagram illustrating a transmission structure of a MIMO system with the 4×4 antenna structure.
Figure 4:
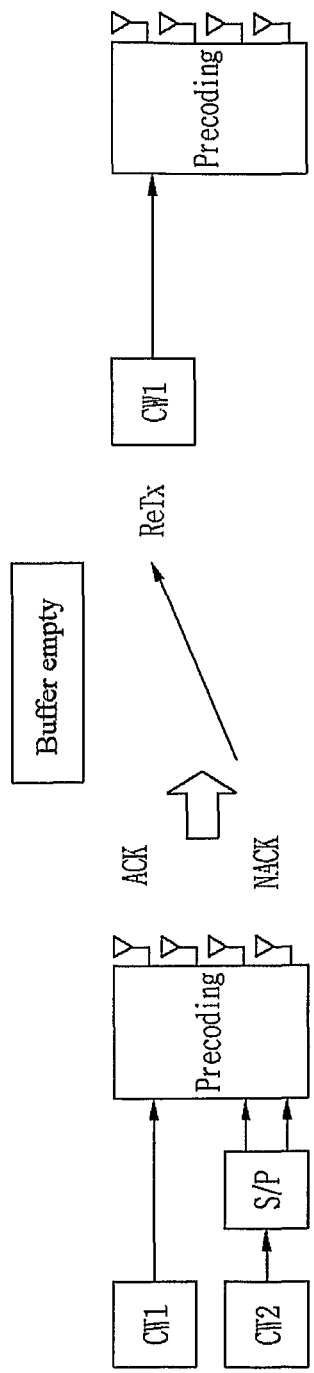
FIG. 4 is a conceptual diagram illustrating a method for retransmitting data when a data buffer is empty after the failure of transmission of a specific codeword in a condition that only the structure of FIG. 3 is allowed.

Referring to FIG. 1, if each of a transmission end and a reception end uses a plurality of antennas, a theoretical channel transmission capacity of the MIMO communication system increases in proportion to the number of antennas, differently from the above-mentioned case in which only a transmitter or receiver uses a plurality of antennas, so that a transfer rate and a frequency efficiency can greatly increase.

Detailed descriptions of a variety of MIMO technologies will hereinafter be described in detail. For example, the spatial diversity scheme, the spatial multiplexing scheme, and the combination thereof will hereinafter be described in detail.

Firstly, the spatial diversity scheme will hereinafter be described. The spatial diversity scheme is classified into a space-time block code scheme and a space-time Trellis code scheme which can simultaneously uses a diversity gain and a coding gain. Generally, a bit error ratio (BER) improvement performance and a code-generation degree of freedom of the space-time Trellis code scheme are superior to those of the space-time block code scheme, whereas the calculation complexity of the space-time block code scheme is superior to that of the space-time Trellis code scheme. The above-mentioned spatial diversity gain corresponds to the product or multiplication of the number ($N_T$) of Tx antennas and the number ($N_R$) of Rx antennas, as denoted by $N_T \times N_R$.

Secondly, the spatial multiplexing scheme will hereinafter be described. The spatial multiplexing scheme is adapted to transmit different data streams via individual Tx antennas. In this case, a receiver may unavoidably generate mutual interference between data segments simultaneously transmitted from a transmitter. The receiver removes this mutual interference from the received data using a proper signal processing technique, so that it can receive the resultant data having no interference. In order to remove noise or interference from the received data, a maximum likelihood receiver, a ZF receiver, a MMSE receiver, a D-BLAST, or a V-BLAST may be used. Specifically, if a transmission end can recognize channel information, a Singular Value Decomposition (SVD) scheme may be used to remove the noise or interference.

Thirdly, the combination of the spatial diversity scheme and the spatial multiplexing scheme will hereinafter be described. Provided that only a spatial diversity gain is acquired, the performance-improvement gain is gradually saturated in proportion to an increasing diversity order. Otherwise, provided that only the spatial multiplexing gain is acquired, a transmission reliability of a RF channel is gradually deteriorated. As a result, a variety of schemes capable of acquiring all the above-mentioned two gains simultaneously while solving the above-mentioned problems have been intensively researched by many companies or developers, for example, a double-STTD scheme and a space-time BICM (STBICM) scheme.

A variety of diversity methods can be applied to the present invention, and the above-mentioned multi-user diversity is considered to be one of them. This diversity uses the fact that there is a low probability that all independent channels have low gain values. If several users are present in a cell, channel gain values of individual users are stochastically independent of each other, so that the probability that all the users have low gain values is very low. If a Node-B has sufficient transmission (Tx) power according to the information theory and several users are present in a cell, it is preferable that all channels be allocated to a specific user having the highest channel gain value to maximize a total channel capacity. The multi-user diversity can be classified into three kinds of diversities, i.e., a temporal multi-user diversity, a frequency multi-user diversity, and a spatial multi-user diversity.

The time multi-user diversity (also called temporal multi-user diversity) is adapted to allocate a channel to a specific user having the highest gain value whenever a channel situation changes with time.

The frequency multi-user diversity is adapted to allocate a sub-carrier to a specific user having the highest gain value in each frequency band in a frequency multi-carrier system such as an Orthogonal Frequency Division Multiplexing (OFDM) system. If a channel situation slowly changes with time in another system which does not use the multi-carrier, the user having the highest channel gain value will monopolize the channel for a long period of time, other users are unable to communicate with each other. In this case, in order to use the multi-user diversity, there is a need to induce the channel to change.

Next, the spatial multi-user diversity uses different channel gain values of users according to space types. An implementation example of the spatial multi-user diversity is a Random Beam Forming (RBF) method. This RBF method may also be called an opportunistic beam forming. The RBF method performs beam forming with a predetermined weight factor using multiple antennas (i.e., multi-antenna) to induce the change of channel, and uses the above-mentioned spatial multi-user diversity.

Each of all error correction schemes has a maximum-correctable limitation in a channel error correction. In other words, if a reception (Rx) signal has an error exceeding the limitation of a corresponding error correction code, a reception end is unable to decode the Rx signal into information having no error. Therefore, the reception end must determine the presence or absence of an error in the decoded information. In this way, a specialized coding process for performing error detection is required, separately from the forward error correction coding process. Generally, a Cyclic Redundancy Check (CRC) code has been used as an error detection code.

The CRC method is an exemplary coding method for performing the error detection. Generally, the transmission information is coded by the CRC method, and then the forward error correction code is applied to the CRC-coded information. A single unit coded by the CRC and the forward error correction code is generally called a codeword. In the meantime, if several transmission information units are overlapped and then received, the present invention can expect performance improvement using an interference-cancellation receiver. There are many cases in the above-mentioned case in which several transmission information units are overlapped and then received, for example, a case in which the MIMO technology is used, a case in which a multi-user detection technology is used, and a case in which a multi-code technology is used. A brief description of the interference-cancellation structure will be as follows.

According to the interference-cancellation structure, after first information is demodulated/decoded from a total reception signal in which some information is overlapped, information associated with the first information is removed from the total reception signal. A second signal is demodulated/decoded by the resultant signal having no first information removed from the reception signal. A third signal is demodulated/decoded by the resultant signal having no first- and second-information removed from the first reception signal. A fourth signal or other signal after the fourth signal repeats the above-mentioned processes, so that the fourth or other signal is demodulated/decoded. In this way, the above-mentioned method for continuously removing the demodulated/decoded signal from a reception signal to improve a performance of the next demodulating/decoding process is called a Successive Interference Cancellation (SIC) method. In order to use the above-mentioned interference cancellation method such as the SIC, the demodulated/decoded signal removed from the reception signal must have no error. If any error occurs in the demodulated/decoded signal, error propagation occurs so that a negative influence continuously affects all the demodulated/decoded signals.

The above-mentioned interference cancellation technology can also be applied to the MIMO technology. If several transmission information segments are overlapped/transmitted via multiple antennas, the above-mentioned interference cancellation technology is required. In other words, if the spatial multiplexing technology is used, each of transmission information is detected, and at the same time the interference cancellation technology can be used.

However, as described above, in order to minimize the error propagation caused by the interference cancellation, it is preferable that the interference is selectively removed after determining the presence or absence of an error in the demodulated/decoded signal. A representative method for determining the presence or absence of the error in each transmission information is the above-mentioned cyclic redundancy check (CRC) method. A unit of distinctive information processed by the CRC coding is called a codeword. Therefore, a more representative method for using the interference cancellation technology is a specific case in which several transmission information segments and several codewords are used.

Some control information units are needed to effectively operate/manage the MIMO system.

Firstly, the MIMO system must inform a user (i.e., UE) of the channel quality information (CQI). In order to allow a MIMO system to maximally use a channel capacity, the MIMO system uses a link adaptation for effectively transmitting data to users. In order to allow a Node-B to perform the link adaptation, the user equipment (UE) must feed back the channel quality information (CQI) to the Node-B. The MIMO system allocates different CQI values to individual frequency bands for data transmission, and the user equipment (UE) transmits CQI values of all the frequency bands to the Node-B in order to effectively allocate resources. Therefore, a total frequency band is divided into a plurality of unit frequency bands, and the CQI is transmitted to each of the divided frequency bands. This channel quality information (CQI) is also called a channel quality indicator. This CQI can be generated according to a variety of methods. For example, according to a first method, a channel status may be quantized, and the quantized channel status may be notified. According to a second method, a SINR may be calculated, and the calculated CINR may be notified. According to a third method, an actual channel application status may be notified in the same manner as in a modulation coding scheme (MCS).

The CQI may be generated on the basis of the MCS. For example, according to the 3GPP, the CQI is generated for a High Speed Downlink Packet Access (HSDPA). In this way, provided that the CQI is generated on the basis of the MCS, the MCS includes a modulation scheme, a coding scheme, and associated coding rates. Therefore, if the modulation- or coding-scheme is changed, the CQI must also be changed, such that there is needed at least one CQI for each codeword unit.

There are two communication channels between the Node-B and the user equipment (UE), i.e., a data traffic channel and a control channel for controlling the data traffic channel. The data traffic channel and the control channel may have different frequency- and spatial-bands. As a result, the data traffic channel and the control channel may also have different CQI values. Generally, the multi-carrier system may use the frequency- and spatial-diversities in all bands of the control channel. Therefore, the control-channel CQI is measured in all the bands. On the contrary, in the case of the data traffic channel, the scheduling for each frequency band and the spatial multiplexing for each frequency band are used. Therefore, the CQI for the data traffic channel divides the frequency band into sub-frequency bands, spatially classifies the sub-frequency bands, measures signals in the individual sub-frequency bands, and feeds backs the measured result.

Secondly, the MIMO system can transmit a plurality of independent data streams, such that it must transmit specific information indicating how many independent data streams can be transmitted at a current transmission time. This rank information is called a rank. Therefore, this rank is indicative of the number of data streams capable of being maximally transmitted at a transmission time. At least one CQI must be transmitted to each codeword, but rank information is decided according to the combination of antennas of a transceiver. In other words, the system including M number of Tx antennas and N number of Rx antennas has a maximum rank of min (M,N).

Thirdly, the precoding-based MIMO system must transmit control information associated with either a precoding vector or a precoding matrix. The above-mentioned precoding vector or matrix is the most appropriate for a current channel status. The precoding vector or the precoding matrix may be predetermined by a transceiver for each rank. In this case, only index information of the predetermined precoding-vector or matrix is transmitted to the transceiver, such that the transmission load of the control information can be reduced.

This channel quality information (CQI) can be transmitted using either an upper layer signal or a physical layer control signal. In the case of transmitting the channel quality information (CQI) using the physical layer control signal, the MIMO system determines the presence or absence of a downlink shared channel (DL-SCH) allocated to a corresponding UE for implementation of uplink transmission, performs puncturing of data symbols or bits of the DL-SCH, and transmits the punctured symbols or bits. Otherwise, the MIMO system may transmit the above data symbols or bits to a reserved control channel such as a Physical Uplink Control Channel (PUCCH).

Figure 5:
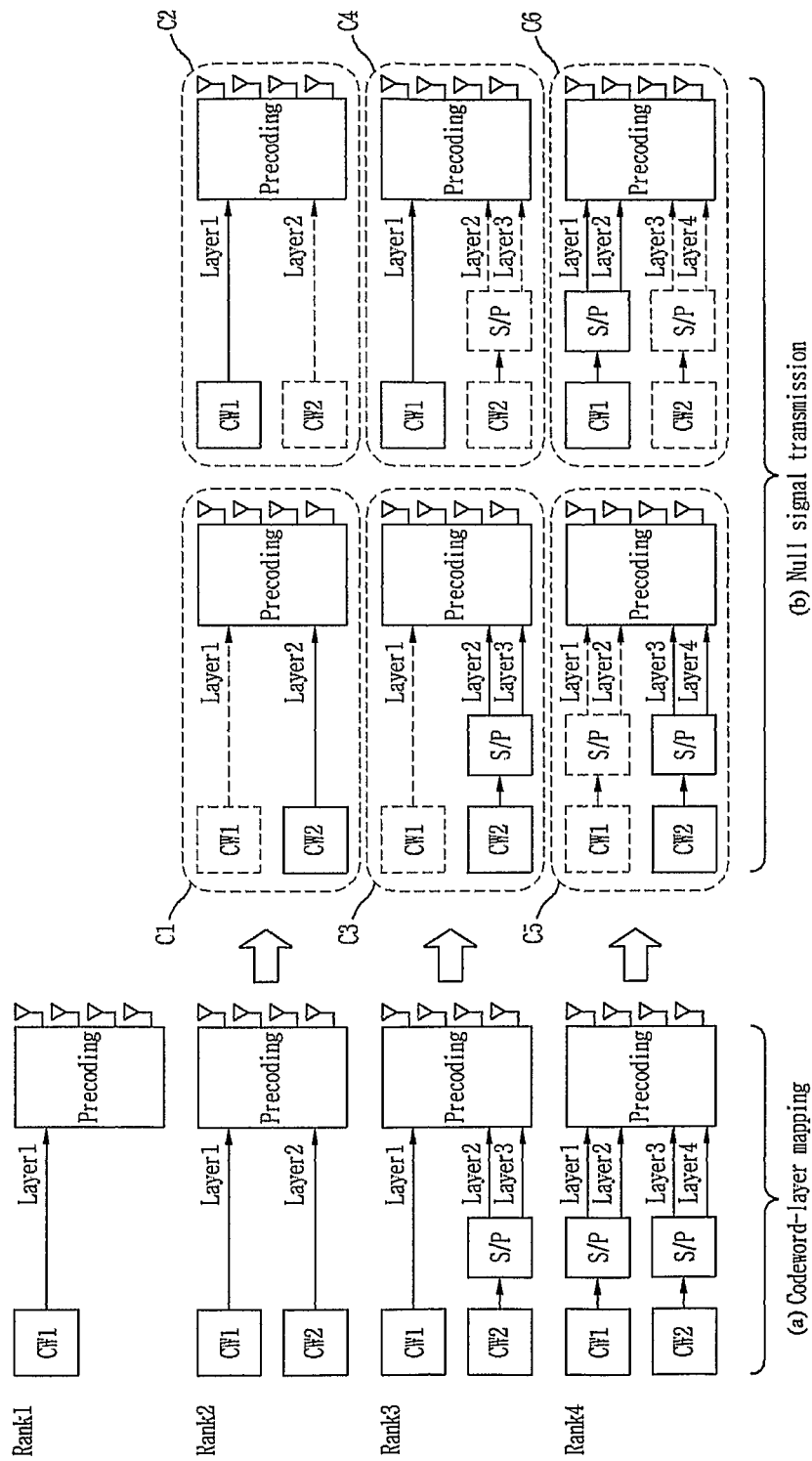
FIG. 5 is a conceptual diagram illustrating mapping relationships for each rank between codewords and layers, and the null signal transmission according to the present invention.

FIG. 5 is a conceptual diagram illustrating the mapping relationship for each rank between the codeword and the layer, and the null signal transmission according to the present invention.

Rank 1 shown in FIG. 5 (a) includes a precoding block and a single codeword block. Each of rank 2 to rank 4 shown in FIG. 5 (a) and FIG. 5 (b) includes a precoding block and two codeword blocks.

For each of the four ranks, the mapping relationship between the codeword and each layer may be restricted as shown in FIG. 5 (a). A detailed description of the above-mentioned mapping relationship will hereinafter be described with reference to FIG. 5 (a). The amount of signaling information applied from the Node-B to the UE can be reduced by restricting mapping relationship.

Referring to FIG. 5 (a), for each rank (rank 1 to rank 4), one mapping relationship between codewords and layers is allowed. Information of four mapping combinations can be notified by 2 bits because four mapping combinations for four ranks are available.

For the structure of FIG. 5 (a), the present invention assumes the following situation. In other words, the MIMO system simultaneously transmits a codeword of CW1 and a codeword of CW2 using rank 2 at a specific time (t1); thereafter, although the codeword of CW1 has been successfully transmitted, it is assumed that the failure of transmission of the codeword of CW2 has occurred. In addition, a Tx data buffer of the Node-B may be empty at a time (t2) at which the failed codeword is to be retransmitted. Also, it is assumed that the CQI of a channel mapped to the CW2 is better than the CQI of a channel used for the codeword of CW1 at a time t1 and t2. Under the above-mentioned situation, when the Tx-failed codeword is retransmitted at the time t2, it is preferable to retransmit via layer 2 which is mapped to a channel having better CQI. However, the MIMO system is unable to reconstruct either the permutation of a vector of a given precoding matrix depending on the layer's channel characteristics or the antenna construction, such that the reconstruction of the mapping relationship between layers and codewords is not allowed. Therefore, under the above-mentioned situation, the codeword, which must be retransmitted, is retransmitted by layer 1 via CW1 of rank 1, such that the above-mentioned retransmission codeword cannot be retransmitted via layer 2. In other words, if only one codeword is transmitted, the MIMO system must use only rank 1 from among given structures without considering the status of the individual channels, such that the codeword can be transmitted via only layer 1.

However, the MIMO system can transmit data according to the following scheme by referring to the structure C1 of FIG. 5 (b). In other words, although a single codeword is retransmitted, the MIMO system constructs control information as if a codeword of CW1 and a codeword of CW2 have been transmitted using rank 2. The MIMO system indicates that the transport block size information is 0 and the first layer may transmit no data (i.e., Null Transmission or Tx off or Blanking). The retransmission codeword can be transmitted via CW2 of rank 2. As a result, the MIMO system can transmit only the retransmission codeword simultaneously while still using rank 2. Basically, although the MIMO system uses the restricted structure of FIG. 5 (a), it may transmit data over better channels.

In this case, if rank which has been transmitted from the UE to the Node-B is always used by the Node-B, the downlink control information may be constructed without rank information which is transmitted from the Node-B to the UE by an agreement between the Node-B and the UE.

In addition, the PMI used for calculating CQI corresponding to rank which has been reported to the Node-B by the UE may also be used without any change. Also, the codeword transmitted via the CW2 has no interference caused by the CW1 because the codeword is not actually transmitted via the CW1. Therefore, the CQI of a Tx channel for the codeword of CW2 transmitted from the Node-B is equal to or better than the CQI of other channel mapped to CW2 of rank 2 calculated by the UE (Interference is included because the UE calculates CQI under the assumption of transmission of the CW1). That means, a CQI equal to or better that the CQI reported from the IE is guaranteed.

In this case, if the Node-B always uses the PMI transmitted from the UE to the Node-B, the downlink control information may be constructed without transmitting PMI information from the Node-B to the UE by an agreement between the Node-B and the UE.

Also, if the MIMO system transmits a codeword of CW1 and a codeword of CW2 without transmitting a null signal, a power used by the Node-B is distributed to the two codewords. However, if the MIMO system indicates that the transport block (TB) size is 0 and no data is transmitted, the codeword of CW2 is transmitted whereas the codeword of CW1 is not transmitted, such that the power capable of being allocated to the codeword of CW1 can be additionally allocated to the codeword of CW2, and the codeword of CW2 is transmitted with the added power. Therefore, the pre-reported CQI is guaranteed for the channel mapped to CW2, such that the MCS of the codeword of CW2 may increase in response to the increment of the power of the codeword of CW2, or the redundancy of the codeword of CW2 may increase in response to the increment of the power of the codeword of CW2.

Generally, the transport block (TB) size includes information bits regarding the amount of resources for data transmission, and the TB size for adjusting the combination of modulation schemes and code rates. However, in the case that the codeword of CW1 and the codeword of CW2 share the above-mentioned information indicating the amount of resources for data transmission, the MIMO system has difficulty in using the TB-size field to perform a signaling indicating transmission of a null signal. Therefore, the MIMO system may use a state of information composed of bits for the modulation scheme and the TB-size information bits (e.g., modulation coding set (MCS) information) to indicate the transmission of the null signal.

The MIMO system can transmit information of the null status (MCS=Null or 0) indicating the null-signal transmission without additionally increasing the number of bits because the number of states for this combination is greater than the number of states for information indicating rank. In other words, although the MIMO system uses a specific combination of the above-mentioned information to indicate the null-signal transmission, the system operations may be little affected by the above combination. For example, provided that the information for MCS is composed of a total of 6 bits and the duplicated case is not considered, there are $2^6$=64 number of MCS states. In the case where one of 64 states indicates the value of "MCS=0", this case corresponds to 1/64 of all the states, such that the MIMO system may be little influenced by this case. In the precedent example for rank 2, a UE can check the codeword of CW1 is not actually transmitted and only the codeword of CW2 is transmitted because the UE receives information of rank 2 and checks the MCS.

If every information for the last TB size is independently constructed for each codeword, any one of all states, which is determined by the combination of information bits for the amount of resources for data transmission, and TZ-size for adjusting code rate and the combination of modulation schemes (e.g., by defining TB size=Null or TB size=0), can be allocated for transmission of the null signal.

In the above-mentioned description, the amount of resources for data transmission may be denoted by $N_{PRB}$, the modulation scheme may be denoted by $Q_m$, the TB-size information bits for adjusting the code rate may be denoted by $I_{TBS}$. The MCS information may also be denoted by $I_{MCS}$. In this case, $N_{PRB}$ may be indicative of a total number of allocated physical resource blocks. $Q_m$ may have any one of 2, 4, and 6.

The following table 1 is provided for better understanding of the present invention. Specifically, the following table 1 shows exemplary modulation and TBS index table for a physical downlink shared channel (PDSCH). The UE may decide a modulation order ($Q_m$) using table 1 and $I_{MCS}$ value. Also, the UE may decide the TBS index ($I_{TBS}$) using the $I_{MCS}$ value. In Table 1, $I_{MCS}$ value may have the values of 0~31. Provided that the information for MCS is composed of a total of 6 bits, $2^6$=64 number of MCS states can exist, such that it can be assumed that one of 64 states indicates the value of "MCS=0".

TABLE 1

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| ... | ... | ... |

TABLE 1-continued

| MCS Index $I_{MCS}$ | Modulation Order $Q_m$ | TBS Index $I_{TBS}$ |
|---|---|---|
| 27 | 6 | 25 |
| 28 | 6 | 26 |
| 29 | 2 | reserved |
| 30 | 4 | |
| 31 | 6 | |

The following table 2 is provided for better understanding of the present invention. Specifically, the following table 2 shows the TB size decided by the TBS index ($I_{TBS}$) and the value of $N_{PRB}$. As described above, if each of information for the last TB size is independently constructed for each codeword, any one of all states decided by the combination of $N_{PRB}$, $Q_m$, and $I_{TBS}$ values can be allocated to transmit the null signal. In more detail, according to the following table 2, (27×110) number of combinations can be made available. By allocating '0' to one of these combinations, it can be indicated that a null signal is transmitted. In the following table 2, if the value of $I_{TBS}$ is 0 and the value of $N_{PRB}$ is 1, the TB size is determined to be '16'.

TABLE 2

| | $N_{PRB}$ | | | | | |
|---|---|---|---|---|---|---|
| $I_{TBS}$ | 1 | 2 | 3 | ... | 109 | 110 |
| 0 | 16 | 32 | 56 | ... | 2984 | 3112 |
| 1 | 24 | 48 | 88 | ... | 4008 | 4008 |
| 2 | 32 | 72 | 120 | ... | 4968 | 4968 |
| 3 | 40 | 104 | 152 | ... | 6456 | 6456 |
| ... | ... | ... | ... | ... | ... | ... |
| 25 | 616 | 1256 | 1864 | ... | 68808 | 71112 |
| 26 | 648 | 1320 | 1992 | ... | 71112 | 73712 |

In the meantime, the downlink control information used for scheduling PDSCH may include a variety of fields, e.g., a field of a resource allocation header, a field of a resource block allocation, a field of a TPC command for PUCCH, a field of a downlink allocation index, a field of a HARQ process number, and a field of a HARQ swap flag. In this case, in order to indicate the null-signal transmission, the present invention may also use a field used for transmitting the HARQ process ID. For example, the MIMO system discriminates between the null-signal transmission and the null-signal non-transmission, such that the HARQ process ID can be signaling-processed according to the discriminated result.

In addition, the MIMO system may indicate non-transmission of some codewords by using the null-state signaling. If the power capable of being allocated to the non-transmission (non-Tx) codeword is allocated to the transmission (Tx) codeword, data can be effectively demodulated even using the 16QAM or a 64QAM scheme.

If the Node-B performs the signaling for transmitting the null signal to the UE, the interference of the non-transmission codeword can be excluded, such that the optimum decoding in which only the Tx codeword is considered can be carried out.

The above-mentioned method can be made available when at least one codeword is transmitted. Therefore, in a case that a maximum of two codewords is transmitted according to the above-mentioned method, the null signal can be transmitted only for one of the codewords. A method for transmitting null signals for two codewords may also be used for other purposes. For example, the null signals for two codewords can be transmitted to indicate that the transmission is carried out under a default mode on the condition that the downlink channel information was not received.

In the meantime, it can be the case that, while the Node-B transmits a null signal for a codeword (e.g., codeword of CW1), the Node-B may not inform the UE of the null-status signaling. In this case, if the UE attempts to decode a corresponding codeword (i.e., codeword of CW1), a decoding failure may occur. Then, the UE transmits the NACK signal for the corresponding codeword (i.e., the codeword of CW1) to the Node-B, and waits for retransmission from the Node-B. If the Node-B transmits data for the corresponding codeword (i.e., the codeword of CW1), control information indicating that new Tx data instead a retransmission data is transmitted is transmitted. Then, the system allows the buffer waiting for the retransmission to be empty, such that transmission/reception operations for new data are carried out. In the meantime, if the corresponding codeword (i.e., the codeword of CW1) is not transmitted during a specific time, the UE terminates the retransmission waiting status for the corresponding codeword (i.e., the codeword of CW1).

In the case of considering a specific case in which the UE enters an idle state, the UE enters the idle state after the lapse of a specific time on the basis of a Rx time of the last downlink control information. As a result, the UE is able to enter the idle state at the same instant, irrespective of the presence or absence of a signal indicating the null-signal transmission.

In the meantime, if the UE does not perform the signaling for the null-signal transmission, resource allocation information of the non-transmission codeword, modulation information, and TB-size information are transmitted. Because the UE attempts to perform the decoding process on the basis of the above-mentioned information, it is preferable to transmit information with minimum TB-size by reducing TB-size information or modulation information regarding corresponding codeword so that a UE can reduce a buffer size and the number of calculation during decoding.

Figure 6:
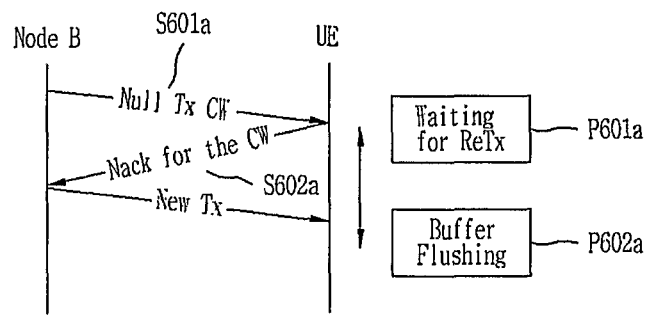
FIG. 6 is a conceptual diagram illustrating an exemplary method for exchanging messages between a Node-B and a UE according to the present invention.
Figure 6:
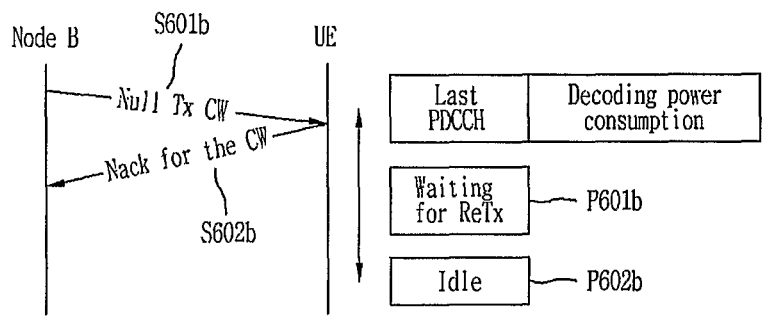
Figure 6:
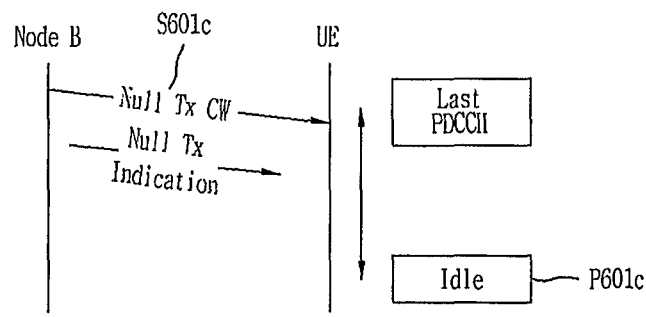

FIG. 6 is a conceptual diagram illustrating an exemplary method for exchanging messages between a Node-B and a UE according to the present invention.

Referring to FIG. 6 (a), the Node-B does not perform the signaling indicating transmission of the null signal, but transmits the null signal for a specific codeword at step S601a. The UE fails in decoding the above specific codeword, and transmits the NACK for this specific codeword at step S602a. Thereafter, the UE waits for retransmission of the specific codeword at step P601a. The Node-B transmits new data, and at the same time can transmit control information indicating that this new data is not a retransmission data but a new Tx data at step S603a. The UE receives this control information, performs the buffer flushing, and transmits/receives new data at step P602a.

Referring to FIG. 6 (b), the Node-B does not perform the signaling for the null-signal transmission, but transmits the null signal to a specific codeword at step S601b. The UE fails in decoding the above specific codeword, and transmits the NACK for this specific codeword at step S602b. Thereafter, the UE waits for retransmission of the specific codeword at step P601b. In this case, if the received downlink control information is the last downlink control information, the UE may enter the idle state after the lapse of a specific time on the basis of a Rx time of the last downlink control information at step P601b.

Referring to FIG. 6 (c), the Node-B transmits the signaling message indicating the null-signal transmission, and at the same time transmits the null signal for a specific codeword at step S601C. In this case, if the received downlink control information is the last downlink control information, the UE may enter the idle state after the lapse of a specific time on the basis of a Rx time of the last downlink control information at step P601c.

Referring back to FIG. 5 (a), the present invention can also be applied to rank 3 shown in FIG. 5 (a). The codeword of CW2 is transmitted via two layers (i.e., layer2 and layer3). If the layer1, the layer2, and the layer3 have the same MCS, the amount of Tx data via CW2 is double that of CW1. After the codeword of CW1 and the codeword of CW2 have been transmitted at the time t1, the codeword of CW1 may be successfully transmitted, whereas the codeword of CW2 may fail in transmission. In this case, the Tx-failed codeword is needed to be retransmitted at the other time t2. However, if the data buffer of the codeword of CW1 of rank 3 was empty at the time t2, there is only one retransmission codeword, such that the system is unable to use the original structure of rank 3 without modifying the structure of rank 3. In this case, the following methods can be made available.

Firstly, the structure of rank 1 shown in FIG. 5 (a) may be used. In other words, the codeword which should be retransmitted may be input to a codeword block of rank 1, and transmitted via layer 1. In this case, only one layer (i.e., layer1) is used, such that it may unavoidably deteriorate a transfer rate.

Secondly, the structure of rank 2 shown in FIG. 5 (a) may be modified into the C1 or C2 structure shown in FIG. 5 (b). In this case, only one codeword is retransmitted, such that the null signal can be transmitted for CW1 (C1). For example, the null signal is transmitted for CW1, and the retransmission (ReTx) codeword can be allocated to CW2. However, in this case, the retransmission codeword is transmitted via only layer2, such that a transfer rate may be deteriorated. To the contrary, the null signal may be transmitted for CW2 (C2). In this case, the retransmission codeword may be transmitted via only layer1, such that a transfer rate may also be deteriorated.

Thirdly, preferably, the structure of rank 3 of FIG. 5 (a) may be modified into the C3 structure shown in FIG. 5 (b). If the retransmission codeword is allocated to CW2, and the null signal is transmitted for CW1 (C3), the retransmission codeword is transmitted via two layers (i.e., layer2 and layer3), such that retransmission can be effectively carried out.

To the contrary, if the retransmission codeword is allocated to CW1 and the null signal is transmitted for CW2 (C4), the retransmission codeword is transmitted via only a single layer (i.e., layer1), such that a transfer rate may be deteriorated.

Fourthly, alternatively, the structure of rank 4 shown in FIG. 5 (a) may be modified into the C5 or C6 structure shown in FIG. 5 (b). In this case, the codeword to be retransmitted can be allocated to either one of CW1 or CW2. The retransmission codeword is allocated to CW2, and the null signal can be transmitted for CW1 (C5). Alternatively, the retransmission codeword is allocated to CW1, and the null signal can be transmitted for CW2.

Referring back to FIG. 5 (a), the present invention can also be applied to rank 4 of the structure of FIG. 5 (a). In this structure, after the codeword of CW1 and the codeword of CW2 have been transmitted at the time t1, the codeword of CW1 may fail in transmission, but the codeword of CW2 may be successfully transmitted. In this case, the Tx-failed codeword need be retransmitted at the time t2. However, if the data buffer of CW2 of rank 4 was empty at the time t2, only one retransmission codeword exists, such that the structure of rank 4 cannot be used without any modification. In this case, the following methods for use in the above-mentioned embodiments of the present invention can be made available, and detailed description thereof will hereinafter be described in detail.

Firstly, the structure of rank 1 of FIG. 5 (*a*) can be used. In other words, the codeword to be retransmitted enters the codeword block of rank 1, such that the resultant codeword can be retransmitted via layer 1. However, in this case, a transfer rate may be unexpectedly deteriorated because only one layer is used.

Secondly, the structure of rank 2 of FIG. 5 (*a*) can be modified. In this case, the null signal can be transmitted to either one of CW1 or CW2 as shown in the above-mentioned embodiment because only one codeword is retransmitted. For example, the null signal can be transmitted for CW1, and the retransmission codeword can be allocated for CW2. However, in this case, a transfer rate may be unavoidably deteriorated because the retransmission codeword is transmitted via only one layer (i.e., layer2).

Thirdly, the structure of rank 3 of FIG. 5 (*a*) can be modified and used. If the retransmission codeword is allocated to CW1 and the null signal is transmitted for CW2, a transfer rate may be unavoidably deteriorated because the retransmission codeword is transmitted via only one layer (i.e., layer1). Preferably, to the contrary, if the retransmission codeword is allocated to CW2 and the null signal is transmitted for CW1, the retransmission can be effectively carried out because the retransmission codeword is transmitted via two layers (i.e., layer2 and layer3).

Fourthly, a modified structure of rank 4 shown in FIG. 5 (*a*) may be considered. In this case, the codeword to be retransmitted can be allocated to either one of CW1 or CW2. The codeword to be retransmitted is allocated to CW1, and the null signal can be transmitted for CW2. Alternatively, the codeword to be retransmitted is allocated to CW2, and the null signal can be transmitted for CW1.

Figure 7:
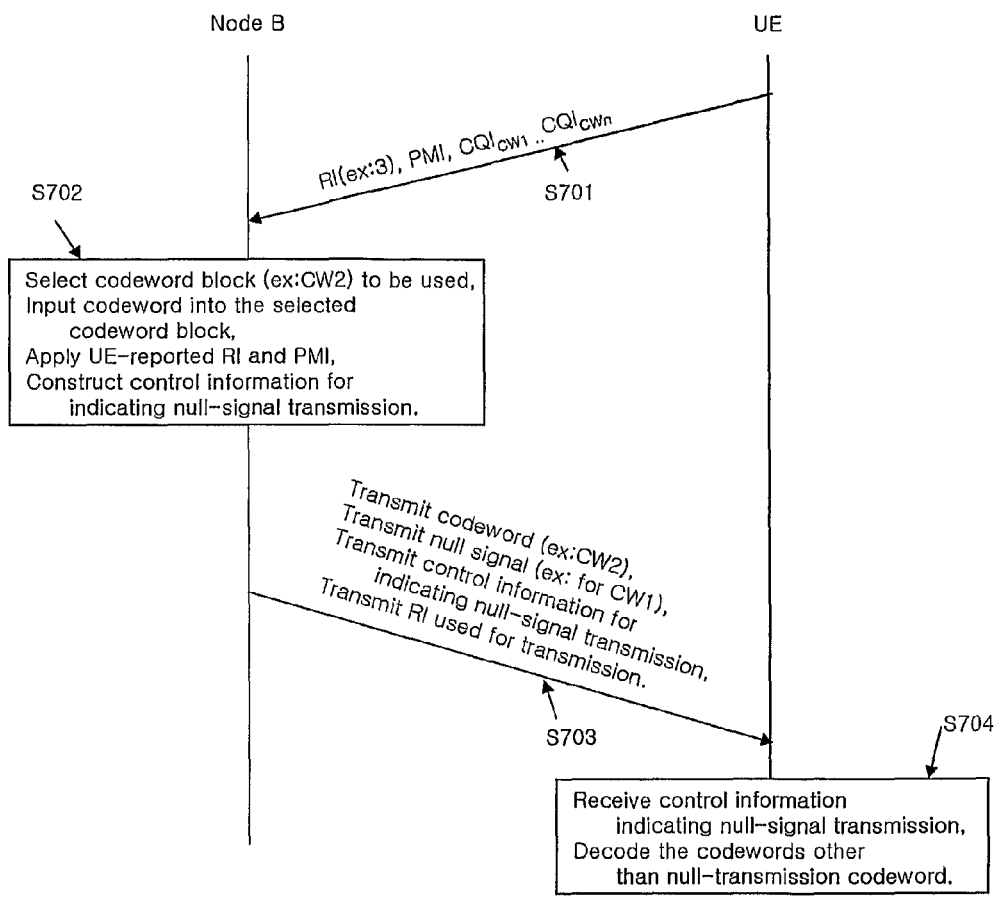
FIG. 7 is a flow chart illustrating a method for transmitting a codeword according to the present invention.

FIG. 7 is a flow chart illustrating a method for transmitting a codeword according to the present invention.

Referring to FIG. 7, the UE measures the channel status, and reports specific information indicating that rank 3 can be used as rank Information (RI) to the Node-B at step S701. The UE transmits a Precoding Matrix Index (PMI), CQI of CW1 ($CQI_{CW1}$) and CQI of CW2 ($CQI_{CW2}$) at step S701. In this case, the above CQI is calculated with the reported PMI. The Node-B receives the above-mentioned downlink channel status information from the UE. For example, based on the received information, the Node-B can recognize that a current channel status allows two codewords to be transmitted using rank 3. However, the Node-B attempts to transmit only one codeword. The Node-B compares $CQI_{CW1}$ with $CQI_{CW2}$, and can select a codeword block mapped to a layer indicating a better channel state capable of transmitting much more data at step S702. However, another method can also be used as a reference for selecting the codeword block. In this case, it may be assumed that CW2 has been selected. The Node-B transmits data using CW2 of rank 3, and may transmit no data via CW1 prescribed in rank 3 at step S703. In other words, an antenna corresponding to CW1 may transmit no data. In this case, CW2 may use the PMI according to the codeword-to-layer mapping defined in rank 3, and data is transmitted via layer2 and layer3 (See Rank3 of FIG. 5). The Node-B transmits a confirmation message, indicating that the codeword-to-layer mapping (i.e., rank 3) and the PMI reported by the UE have been used, to the UE at step S703. The Node-B transmits a message indicating transmission of the null signal for CW1 at step S703. The UE receives a control message from the Node-B, and decodes only the codeword of CW2 at step S704. If the Node-B always uses the RI transmitted from the UE, it may not transmit the above confirmation message indicating that the codeword-to-layer mapping and the PMI have been used. The control information indicating the null-signal transmission may not be constructed at step S702. Otherwise, the control information indicating the null-signal transmission may not be transmitted at step S703. In this case, the UE may use the method of FIG. 6 (*a*) without performing the above step S704.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. It is obvious to those skilled in the art that the above embodiments may be constructed by combining claims having no explicit citation relations or new claims may also be added by the amendment to be made after the patent application The following embodiments of the present invention will be disclosed on the basis of a data communication relationship between the transmission end (e.g., Node-B) and the reception end (e.g., UE). In this case, the Node-B is used as a terminal node of a network via which the Node-B can directly communicate with the user equipment (UE).

The term "Base Station" may be replaced with a fixed station, Node-B, eNode-B (eNB), or an access point as necessary. The user equipment (UE) may also be replaced with a mobile station (MS) or a mobile subscriber station (MSS) as necessary.

The following embodiments of the present invention can be implemented by hardware, firmware, software, or a combination of them.

In the case of implementing the present invention by hardware, the present invention can be implemented with ASICs (application specific integrated circuits), DSPs (Digital signal processors), DSPDs (digital signal processing devices), PLDs (programmable logic devices), FPGAs (field programmable gate arrays), a processor, a controller, a microcontroller, or a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention can be applied to a system, Node-B, or UE which has a predetermined codeword-to-layer mapping relationship for each rank.

The invention claimed:

1. A method for transmitting a signal at a transmission end of a Multiple Input Multiple Output (MIMO) system, the method comprising:
   mapping one codeword for a retransmission among two codewords to N layer among M layers, wherein N and M positive integers, and N is smaller than M, wherein the one codeword was mapped to the N layer when an initial transmission occurs;
   precoding the N layer based on a precoding matrix predefined for the M layers; and
   transmitting the precoded N layer and control information including Modulation Coding Scheme (MCS) values for the one codeword and another codeword of the two codewords to a reception end,
   wherein the N layer is a portion of the M layers,
   wherein the one codeword is used for signal transmission and the another codeword is not used for the signal transmission,
   wherein a transmission power of the N layer is boosted to a transmission power of the M layers,
   wherein the MCS value for the another codeword is 0, and
   wherein the MCS value for the one codeword is increased to a value corresponding to the transmission power of the M layers.

2. The method according to claim 1, wherein M is determined on the basis of rank information (RI) reported from the reception end.

3. A transmission end of a multiple input multiple output system, the transmission end comprising:
   a codeword-to-layer mapping module configured to map one codeword for a retransmission among two codewords to N layer among M layers, wherein N and M are positive integers, and N is smaller than M, wherein the at least one codeword was mapped to the N layer when an initial transmission occurs;
   a precoding module configured to precode the N layer based on a precoding matrix predefined for the M layers;
   a transmission module configured to transmit the precoded N layer and control information including Modulation Coding Scheme (MCS) values for the one codeword and another codeword of the two codewords to a reception end,
   wherein the N layer is a portion of the M layers,
   wherein the one codeword is used for signal transmission and the another codeword is not used for the signal transmission,
   wherein a transmission power of the N layer is boosted to a transmission power of the M layers,
   wherein the MCS value for the another codeword is 0, and
   wherein the MCS value for the one codeword is increased to a value corresponding to the transmission power of the M layers.

4. The method according to claim 1, wherein N is 1 or 2, and M is 4.

* * * * *